United States Patent
Pajukoski et al.

(10) Patent No.: US 9,042,328 B2
(45) Date of Patent: May 26, 2015

(54) CHANNEL QUALITY INDICATOR REPORTING IN COMMUNICATIONS SYSTEM

(75) Inventors: Kari Pekka Pajukoski, Oulu (FI); Kari Juhani Hooli, Oulu (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 130 days.

(21) Appl. No.: 13/983,586

(22) PCT Filed: Feb. 4, 2011

(86) PCT No.: PCT/EP2011/051662
§ 371 (c)(1),
(2), (4) Date: Aug. 5, 2013

(87) PCT Pub. No.: WO2012/103957
PCT Pub. Date: Aug. 9, 2012

(65) Prior Publication Data
US 2013/0315188 A1    Nov. 28, 2013

(51) Int. Cl.
*H04W 72/04* (2009.01)
*H04L 1/00* (2006.01)
(Continued)

(52) U.S. Cl.
CPC .......... *H04W 72/0406* (2013.01); *H04B 7/0632* (2013.01); *H04B 7/0647* (2013.01);
(Continued)

(58) Field of Classification Search
CPC .......... H04W 72/0406; H04W 72/042; H04W 24/10; H04L 1/0001; H04L 1/0026–1/0029; H04L 1/003; H04L 1/0053; H04L 1/0091; H04L 5/001; H04L 5/0057; H04L 25/03343; H04B 17/24; H04B 17/382

USPC .................................................. 370/252–329
See application file for complete search history.

(56) References Cited

U.S. PATENT DOCUMENTS 8,711,766 B2 * 4/2014 Kazmi et al. .................. 370/328
8,737,997 B2 * 5/2014 Xiong et al. ............... 455/435.2
(Continued)

FOREIGN PATENT DOCUMENTS

WO    WO2008/157636 A2    12/2008

OTHER PUBLICATIONS

Ericsson et al., "Updates of L1 parameters for CA and UL/DL MIMO"; 3GPP Draft; 3GPP TSG-RAN2 Meeting #72bis; Dublin, Ireland, Jan. 17-21, 2011; R2-110694; 22 pgs.
(Continued)

*Primary Examiner* — Afsar M Qureshi
(74) *Attorney, Agent, or Firm* — Harrington & Smith

(57) ABSTRACT

A solution for periodic channel quality indicator reporting in a communications system is disclosed. A user equipment performs the method steps of receiving radio resource configuration signalling from a network apparatus, and checking a channel quality indicator mode of the received radio resource configuration signalling. Based on said checking, the user equipment determines a container for a periodic channel quality indicator report, and based on said determining, selects a physical uplink control channel transmission format for the periodic channel quality indicator report. If the determined container of the periodic channel quality indicator report is a reduced-bit container, a modified physical uplink control channel format 1b is selected as the physical uplink control channel transmission format for the periodic channel quality indicator report.

28 Claims, 5 Drawing Sheets

(51) Int. Cl.
*H04L 5/00* (2006.01)
*H04B 7/06* (2006.01)

(52) U.S. Cl.
CPC ............. *H04L 1/003* (2013.01); *H04L 5/0053* (2013.01); *H04L 5/0091* (2013.01); *H04L 1/0027* (2013.01); *H04L 5/0057* (2013.01); *H04B 17/24* (2015.01); *H04B 17/382* (2015.01)

(56) References Cited

U.S. PATENT DOCUMENTS

| | | | |
|---|---|---|---|
| 2010/0118719 A1* | 5/2010 | Ishii et al. | 370/252 |
| 2010/0202311 A1* | 8/2010 | Lunttila et al. | 370/252 |
| 2010/0271970 A1* | 10/2010 | Pan et al. | 370/252 |
| 2011/0044261 A1* | 2/2011 | Cai et al. | 370/329 |
| 2011/0194523 A1* | 8/2011 | Chung et al. | 370/329 |
| 2012/0147838 A1* | 6/2012 | Qin et al. | 370/329 |
| 2012/0188975 A1* | 7/2012 | Li et al. | 370/329 |
| 2013/0195006 A1* | 8/2013 | Kim et al. | 370/315 |
| 2013/0294372 A1* | 11/2013 | Ishii et al. | 370/329 |

OTHER PUBLICATIONS

3GPP TSG RAN WG1 #61; Montreal, Canada, May 10-14, 2010; "Performance Comparisons of CA PUCCH Formats"; R1-102716; 8 pgs.

3GPF TSG-RAN WG1 #60bis; Beijing, China, Apr. 12-16, 2010; "Evaluation of PUCCH Proposals for Carrier Aggregation"; R1-101731; 9 pgs.

3GPP TS 36.213 V10.0.1 (Dec. 2010); "3rd Generation Partnership Project; Technical Specification Group Radio Access Network; Evolved Universal Terrestrial Radio Access (E-UTRA); Physical layer procedures (Release 10)"; 98 pgs.

* cited by examiner

CHANNEL QUALITY INDICATOR REPORTING IN COMMUNICATIONS SYSTEM

FIELD OF THE INVENTION

The exemplary and non-limiting embodiments of this invention relate generally to wireless communications networks, and more particularly to periodic channel quality indicator reporting.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

PDCCH (physical downlink control channel) is a transmission channel used to transfer control information from the network to mobile devices. PDCCH defines how a paging channel and shared downlink channels are configured. PDCCH defines uplink transmission scheduling information to help coordinate access control to the radio network. PUCCH (physical uplink control channel) is a transmission channel used to transport user signalling data from mobile devices able to transmit on the control channel. PUCCH transports acknowledgement responses and retransmission requests, sends service scheduling requests, and transfers channel quality information measured by the mobile device to the network.

SUMMARY

The following presents a simplified summary of the invention in order to provide a basic understanding of some aspects of the invention. This summary is not an extensive overview of the invention. It is not intended to identify key elements of the invention or to delineate the scope of the invention. Its sole purpose is to present some concepts of the invention in a simplified form as a prelude to the more detailed description that is presented later.

Various aspects of the invention comprise a method, apparatus, system, and a computer-readable storage medium as defined in the independent claims. Further embodiments of the invention are disclosed in the dependent claims.

According to an embodiment of the invention there is provided method of periodic channel indicator reporting in a communications system, the method comprising performing, in a user equipment, the method steps of receiving radio resource configuration signalling from a network apparatus; checking a channel indicator mode of the received radio resource configuration signalling; based on said checking, determining a container for a periodic channel indicator report; and based on said determining, selecting a physical uplink control channel transmission format for the periodic channel indicator report, wherein if the determined container of the periodic channel indicator report is a reduced-bit container, a modified physical uplink control channel format 1b is selected as the physical uplink control channel transmission format for the periodic channel indicator report to be transmitted from the user equipment to the network apparatus. According to a further embodiment of the invention there is provided a terminal apparatus, wherein the terminal apparatus is configured to receive radio resource configuration signalling from a network apparatus; check a channel indicator mode of the received radio resource configuration signalling; based on said checking, determine a container for a periodic channel indicator report; and based on said determining, select a physical uplink control channel transmission format for the periodic channel indicator report, wherein if the determined container of the periodic channel indicator report is a reduced-bit container, the apparatus is configured to select a modified physical uplink control channel format 1b as the physical uplink control channel transmission format for the periodic channel indicator report to be transmitted from the terminal apparatus to the network apparatus.

According to a yet further embodiment of the invention there is provided a network apparatus for a communications system, the apparatus being configured to transmit radio resource configuration signalling to a user equipment; receive a periodic channel indicator report from the user equipment, the periodic channel indicator report being transmitted by the user equipment by using a physical uplink control channel transmission format selected by the user equipment based on the container of the periodic channel indicator report; and utilize the received periodic channel indicator report for defining a signal interference relation of the channel and/or for multiple-input multiple-output transmission.

According to a yet further embodiment of the invention there is provided a communications system comprising configured to receive, in a terminal apparatus, a radio resource configuration signalling from a network apparatus; check a channel indicator mode of the received radio resource configuration signalling; based on said checking, determine a container for a periodic channel indicator report to be transmitted from the terminal apparatus to the network apparatus; and based on said determining, selecting a physical uplink control channel transmission format for the periodic channel indicator report, wherein if the determined container of the periodic channel indicator report is a reduced-bit container, a modified physical uplink control channel format 1b is selected as the physical uplink control channel transmission format for the periodic channel indicator report to be transmitted from the terminal apparatus to the network apparatus.

According to a yet further embodiment of the invention there is provided a computer-readable storage medium embodying a program of instructions executable by a processor to perform actions directed toward receiving, in a terminal apparatus, radio resource configuration signalling from a network apparatus; checking a channel indicator mode of the received radio resource configuration signalling; based on said checking, determining a container for a periodic channel indicator report to be transmitted from the terminal apparatus to the network apparatus; and based on said determining, selecting a physical uplink control channel transmission format for the periodic channel indicator report, wherein if the determined container of the periodic channel indicator report is a reduced-bit container, a modified physical uplink control channel format 1b is selected as the physical uplink control channel transmission format for the periodic channel indicator report to be transmitted from the terminal apparatus to the network apparatus.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
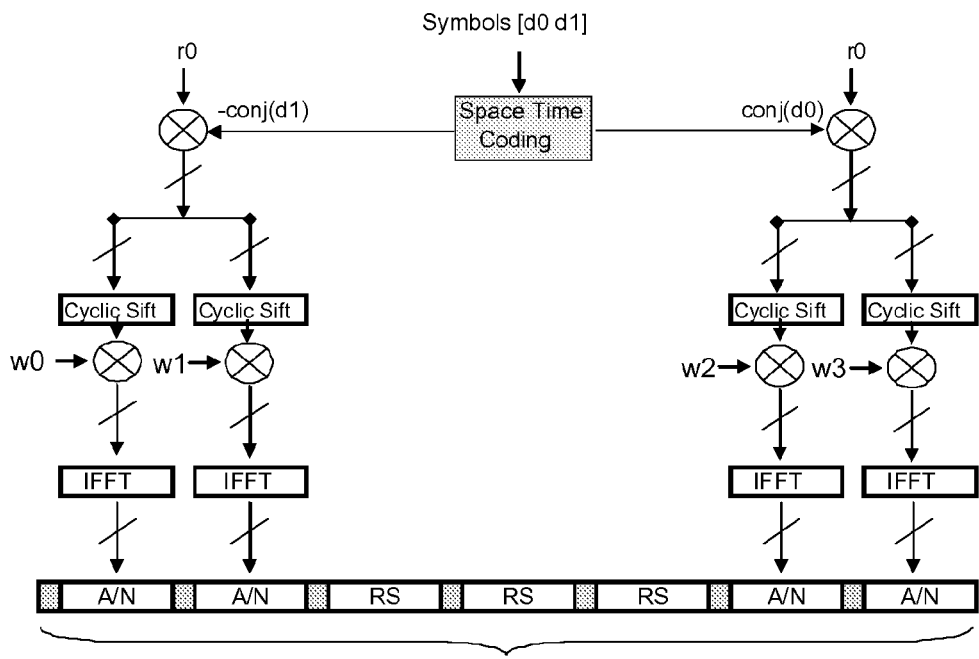
FIG. 1 illustrates transmission diversity according to an exemplary embodiment.

An exemplary embodiment relates to future LTE releases beyond Rel-10, and to a way to reduce the uplink physical uplink channel (PUCCH) overhead related to periodic CQI (channel quality indicator) reporting. In LTE, a user equipment is able to send three types of channel feedback information: CQI (channel quality indicator) information, RI (rank indicator) information, and/or PMI (pre-coding matrix indicator) information. An important part of the channel feedback information is the channel quality indicator CQI. However, it should be noted that the present solution may be applied to all possible channel feedback information types (e.g. CQI/RI/PMI).

Periodic CQI reporting using PUCCH format 2 is a baseline mode for CQI reporting. The size of a periodic CQI report varies between 4 to 11 bits, depending on the selected reporting mode. Although the size of the report varies, PUCCH format 2 with a fixed physical resource size is used every time. The multiplexing capacity of PUCCH format 2 depends on the applied cyclic shift difference between adjacent PUCCH format 2 resources in use. A typical value for the cyclic shift difference between two allocated UEs is two, which results in a multiplexing capacity of 6 simultaneous UEs per physical resource block (PRB). A more dense PUCCH format 2 resource allocation results in excessive multiple access interference in most of the cases.

An exemplary embodiment discloses how to improve the CQI multiplexing capacity and thus reduce CQI overhead in future LTE Releases. Currently, a typical CQI size is 4 bits and typically 400 UEs are configured to transmit a periodic CQI report with a 10 ms activity. This means that 7 PRBs need to allocated in order carry out minimum CQI information (see Formula [1]).

$$\left\lceil \frac{400 \ USs}{6\frac{UEs}{PRB} \cdot 10} \right\rceil \quad \text{Formula [1]}$$

This is a considerable overhead, and it is further emphasized in the case of SU-MIMO UEs using open-loop Tx diversity (SORTD). Utilization of SORTD doubles the periodic CQI overhead compared to the case without SORTD. (SU-MIMO UEs with either 2 or 4 transmit antennas may be configured to use either 1 or 2 antenna ports on PUCCH. SORTD is used when two antenna are configured).

Currently 3GPP Release 8/9/10 PUCCH format 2 involves a poor multiplexing capacity especially with SU-MIMO UEs. VoIP capacity improvement by CQI optimization in PUCCH has been proposed such that the number of CQI bits is decreased to 2 and PUCCH format 1b is used instead of format 2. However, in that case CQI payload is too small; it is not able to support the typical CQI size (4 bits) of LTE Rel-8/9/10.

In an exemplary embodiment a method for minimizing resource usage for periodic CQI reporting on PUCCH is disclosed. In the exemplary embodiment, transmission format used for periodic CQI is selected based on the size of the configured CQI report. The selection may be made between PUCCH format 2 and a modified PUCCH format 1b. Release 11 UEs may be configured to use the modified PUCCH format 1b instead of format 2 when the size of CQI report is 4 bits or smaller. Modified PUCCH format 1b may be determined such that it utilizes the concept of block level spreading for the data part similarly as in PUCCH format 1a/1b. Furthermore, the reference signal structure may be based on PUCCH format 1/1a/1b. However, channelization and PUCCH randomization may be based on that of PUCCH format 2/2a/2b.

PUCCH format 1b may be modified by replacing the normal block-wise spreading with spreading factor (SF) of 4 with two blocks of block-wise spread SC-FDMA symbols, with both blocks using SF of 2. In these two blocks, the orthogonal cover codes of SF 2 are modulated with separate data symbols.

Further, in the modified PUCCH format 1b, a novel transmission diversity method may be applied where the space time coding is applied between the two blocks of block-wise spread SC-FDMA symbols.

In an exemplary embodiment, CQI using modified PUCCH format 1b is transmitted using existing PUCCH resources reserved for PUCCH format 2.

In an exemplary embodiment, modified PUCCH format 1b follows the existing PUCCH format 2/2a/2b channelization structure as in the following signalling arrangement:

resources are configured using dedicated higher layer signalling (RRC), resources used for transmission are identified by a resource index $n_{PUCCH}^{(2)}$ which is mapped into a single cyclic shift resource, resources utilize the cell specific base sequence and cyclic shift randomization applicable to PUCCH format 2, PUCCH format 2a and/or PUCCH format 2b.

Higher layer configuration of modified PUCCH format 1b may be realized by introducing sub-channelization inside an existing PUCCH format 2/2a/2b resource index $n_{PUCCH}^{(2)}$. This may be made e.g. with one or more additional bits in the configuration signalling. The following information elements may be used on top of the existing PUCCH format 2, PUCCH format 2a and/or PUCCH format 2b configuration signalling as follows:

periodic CQI format ('PUCCH format 2' or 'modified PUCCH format 1'), spreading sequence used ([1, 1] or [1, −1]), applicable only in the case of modified PUCCH format 1b, reference signal resource(s) applicable to modified PUCCH format 1b. RS resource may be identified e.g. by resource index $n_{PUCCH}^{(2)}$ and spreading sequence (or orthogonal cover code) applied over RS SC-FDMA symbols; it may be possible to derive the RS resource(s) from the signalled resource index $n_{PUCCH}^{(2)}$, support for concurrent transmission of CQI and ACK/NACK (disabled/enabled).

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein;

rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that support access network discovery and selection function. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment. In the following, different embodiments will be described using, as an example of a system architecture whereto the embodiments may be applied, without restricting the embodiment to such an architecture, however.

In an exemplary embodiment, regarding block spreading arrangement in the case of proposed Tx diversity scheme, the transmission diversity for the modified PUCCH format 1b with SF of 2 is shown in FIG. 1. Space time coding between the block-wise spread SC-FDMA symbols is made in the symbol level prior to the spreading operations. Thus full spatial diversity may be achieved without waste of data resources. FIG. 1 illustrates a space time coding arrangement over block-wise spread OFDMA symbols for a second antenna port. (In the arrangement, for a first antenna, port −conj(d1) may be replaced with d0, and conj(d0) may be replaced with d1). Walsh-Hadamard codes may be used for block-wise spreading with SF 2. Thus the Walsh-Hadamard codes of SF 4, used in normal PUCCH format 1b, are combinations of these codes. Hence the block-wise spreading code is numerated as w0, w1, w2 and w3 in FIG. 1. As with normal PUCCH format 1/1a/1b structure, block-wise spreading is applied over the three RS SC-FDMA symbols.

The maximum number of UEs per PRB, assuming 4-bit CQI reports is illustrated in Table 1, wherein CQI size=4 bits, d_shift=2. The resource saving is 100% for single antenna UEs and 300% for SU-MIMO UEs resulting in a significant improvement for the uplink spectrum efficiency. Furthermore, the proposed scheme is backwards compatible in the sense that it does not require dedicated resource space on PUCCH.

Instead, existing PUCCH resources available for PUCCH format 2/2a/2b are available also for the proposed signalling type. This is realised with the proposed signalling arrangement. An alternative, i.e. allocation of the modified PUCCH format 1b on PRB resources with normal PUCCH format 1/1a/1b resources, is not desirable due to shortened spreading factor and PUCCH format 1/1a/1b channelization structure with resource remapping on slot boundary. Each modified PUCCH format 1b allocation reserves one or two PUCCH format 1/1a/1b resource(s) in each slot. However, the reserved resources change between slots due to resource remapping on slot boundary. Thus, effectively each modified PUCCH format 1b allocation reserves from one to four PUCCH format 1/1a/1b resource(s).

TABLE 1

| | 3GPP Release 9 | improved |
|---|---|---|
| maximum number of single-antenna UEs/1 PRB | 6 | 12 |
| maximum number of SU-MIMO UEs/1 PRB | 3 | 9* |

*The number of SU-MIMO UEs depends on the number of RS resources; for 3 RS symbols there are 18 RS signals available supporting 9 SU-MIMO UEs.

If, for example, a performance comparison is carried out between PUCCH format 2 and PUCCH format 1b with SF=2, no significant difference is detected.

In an exemplary embodiment, a method for minimizing resource usage for periodic CQI reporting on PUCCH is described. In the method, the transmission format used for periodic CQI is selected based on the size of a configured CQI report. The selection may be made between PUCCH format 2 and a modified PUCCH format 1b. In an exemplary embodiment, CQI using modified PUCCH format 1b is transmitted using the existing PUCCH resources reserved for PUCCH format 2. In the modified PUCCH format 1b, in a transmission diversity method, the space time coding is applied between the two blocks of block-wise spread SC-FDMA symbols. Thus capacity enhancement for periodic CQI transmitted on PUCCH may be achieved.

Figure 2:
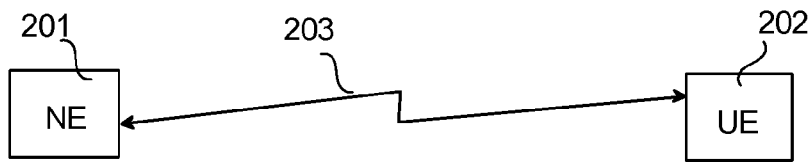
FIG. 2 shows a simplified block diagram illustrating exemplary system architecture.

With reference to FIG. 2, let us examine an example of a radio system to which embodiments of the invention can be applied. In this example, the radio system is based on LTE network elements. However, the invention described in these examples is not limited to the LTE radio systems but can also be implemented in other radio systems, such as UMTS (universal mobile telecommunications system), GSM, EDGE, WCDMA, bluetooth network, WLAN or other mobile or wireless network. In an embodiment, the presented solution may be applied between user equipment belonging to different but compatible systems such as LTE and UMTS.

A general architecture of a communication system is illustrated in FIG. 2. FIG. 2 is a simplified system architecture only showing some elements and functional entities, all being logical units whose implementation may differ from what is shown. The connections shown in FIG. 2 are logical connections; the actual physical connections may be different. It is apparent to a person skilled in the art that the systems also comprise other functions and structures. It should be appreciated that the functions, structures, elements, and protocols used in or for wireless communication are irrelevant to the actual invention. Therefore, they need not be discussed in more detail here.

The exemplary radio system of FIG. 2 comprises a network node 201 (network element, NE). The network node 201 may include e.g. a base station (BS, eNB), radio network controller (RNC), base station controller (BSC), MSC server (MSS), serving GPRS support node, mobility management entity (MME), home location register (HLR), home subscriber server (HSS), visitor location register (VLR) or any other radio network element or core network element or a combination of network elements. The network node 201 is capable connecting to a user equipment directly via a connection 203 or via one or more further network elements. The user equipment (UE) 202 refers to a portable computing device, and it may also be referred to as a user terminal. Such computing devices include wireless mobile communication devices operating with or without a subscriber identification module (SIM), including, but not limited to, the following types of devices: mobile phone, smart-phone, personal digital assistant (PDA), handset, laptop computer. In the example situation of FIG. 2, the user equipment 202 is capable of connecting to the network node 201 via a connection 202. FIG. 2 shows a situation where UE is connected to the network node 201 via a radio access network via connection 203.

FIG. 2 only illustrates a simplified example. In practice, the net-work may include more base stations and radio network controllers, and more cells may be formed by the base stations. The networks of two or more opera-tors may overlap, the sizes and form of the cells may vary from what is depicted in FIG. 2, etc. The communication system may also be able to communicate with other networks, such as a public switched telephone network. The embodiments are not, however, restricted to the network given above as an example, but a person skilled in the art may apply the solution to other communication networks provided with the necessary properties. For example, the connections between different network elements may be realized with internet protocol (IP) connections.

Figure 3:
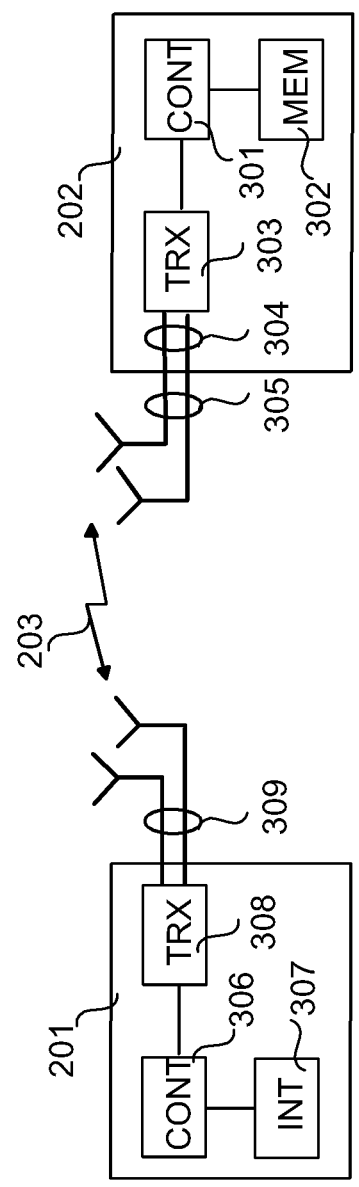
FIG. 3 shows a simplified block diagram illustrating exemplary apparatuses.

FIG. 3 illustrates examples of apparatuses according to embodiments of the invention. FIG. 3 shows a user equipment 202 located in the area of the base station or eNB 201. The user equipment 202 is configured to be in connection with the base station 201. The user equipment or UE 202 comprises a controller 301 operationally connected to a memory 302 and a transceiver 303. The controller 301 controls the operation of the user equipment 301. The memory 302 is configured to store software and data. The transceiver 303 is configured to set up and maintain a wireless connection to the base station 201. The transceiver 303 is operationally connected to a set of antenna ports 304 connected to an antenna arrangement 305. The antenna arrangement 305 may comprise a set of antennas. The number of antennas may be one to four, for example. The number of antennas is not limited to any particular number. The user equipment 202 may also comprise various other components, such as a user interface, camera, and media player. They are not displayed in the figure due to simplicity. The base station or eNB 201 comprises a controller 306 operationally connected to an interface 307 and a transceiver 308. The controller 306 controls the operation of the base station 201. The interface 307 is configured to setup and maintain the connection with a further network element (not shown). The transceiver 308 is configured to set up and maintain a wireless connection to the user equipment 202 within the service area of the base station 201. The transceiver 308 is operationally connected to an antenna arrangement 309. The antenna arrangement 309 may comprise a set of antennas. The number of antennas may be two to four, for example. The number of antennas is not limited to any particular number. The base station may be operationally connected (directly or indirectly) to a further network element of the communication system. The further network element may include an MSC server (MSS), serving GPRS support node, mobility management entity (MME), home location register (HLR), home subscriber server (HSS), visitor location register (VLR), a radio network controller (RNC), a gateway, or a server, for example. The further network element may comprise a controller and a memory configured to store software and data and an interface configured to be in connection with the base station 201.

The embodiments are not, however, restricted to the network given above as an example, but a person skilled in the art may apply the solution to other communication networks provided with the necessary properties. For example, the connections between different network elements may be realized with internet protocol (IP) connections.

The memory may include volatile and/or non-volatile memory and typically stores content, data, or the like. For example, the memory may store computer program code such as software applications (for example for the detector unit and/or for the adjuster unit) or operating systems, information, data, content, or the like for the processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art. User equipment may refer to any user communication device. A term "user equipment" as used herein may refer to any device having a communication capability, such as a wireless mobile terminal, a PDA, a smart phone, a personal computer (PC), a laptop computer, a desktop computer, etc. For example, the wireless communication terminal may be an UMTS or GSM/EDGE smart mobile terminal. Thus, the application capabilities of the device according to various embodiments of the invention may include native applications available in the terminal, or subsequently installed applications. The messaging service center may be implemented in any network element, such as a server.

FIG. 3 is a block diagram of an apparatus according to an embodiment of the invention. Although the apparatus has been depicted as one entity, different modules and memory may be implemented in one or more physical or logical entities.

Figure 4:
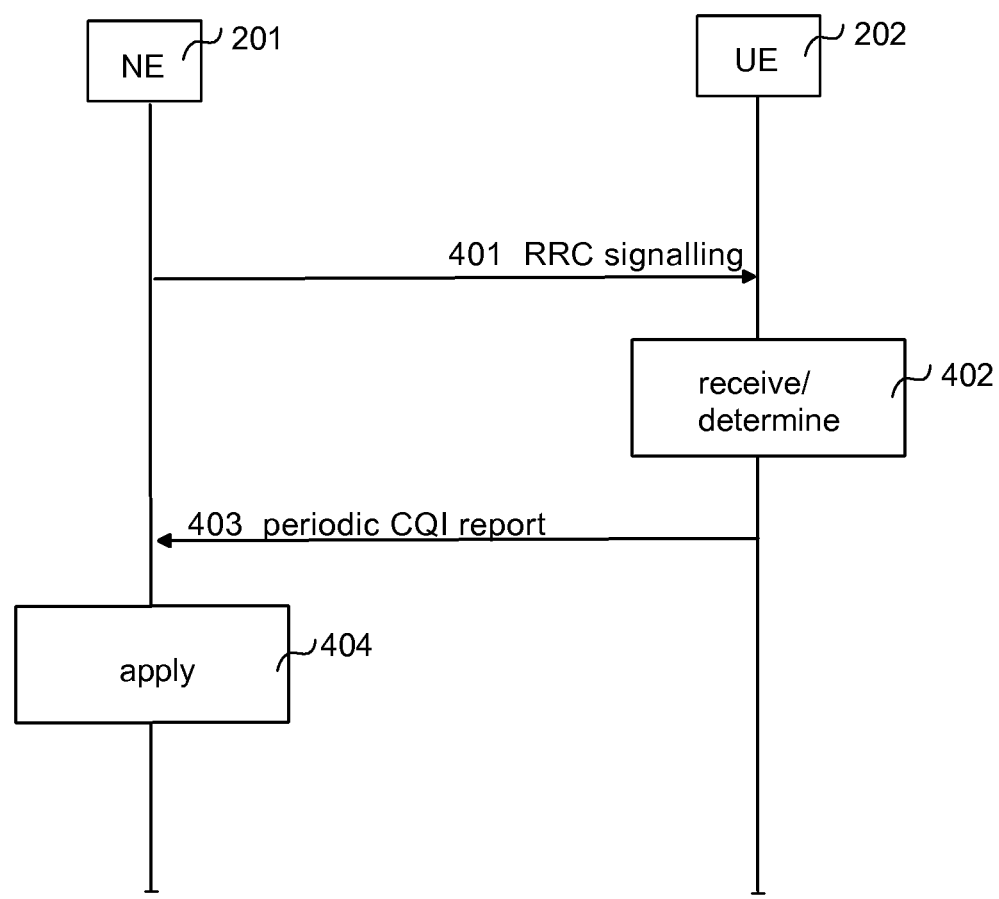
FIG. 4 shows a messaging diagram illustrating an exemplary messaging event according to an exemplary embodiment.

The functionality of the network element 201, 202 is described in more detail below with FIGS. 4 to 6. It should be appreciated that the apparatus 201, 202 may comprise other units used in or for periodic CQI reporting. However, they are irrelevant to the actual invention and, therefore, they need not to be discussed in more detail here.

The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting in-formation to the network, connectable to the network wirelessly or via a fixed connection. Examples of the user terminal include a personal computer, a game console, a laptop (a notebook), a personal digital assistant, a mobile station (mobile phone), and a line telephone.

The apparatus 201, 202 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art. The signaling chart of FIG. 4 illustrates the required signaling. In the example of FIG. 4, a network apparatus 201, which may comprise e.g. radio network node 201 (such as a base station (eNB) or radio network controller (RNC)) or a core network node 201 (such as mobile switching centre MSC), transmits 401 radio resource configuration (RRC) signalling to a terminal apparatus 202 (user equipment UE). The radio resource configuration (RRC) signalling comprises information on a channel quality indicator (CQI) mode of the transmitted downlink transmission. Periodic reporting using PUCCH is a baseline mode for channel feedback reporting in LTE. eNB configures parameters, such as periodicity and payload size, via higher layers using radio resource configuration (RRC). In step 402, the RRC configuration signalling is received in the terminal apparatus 202. In step 402, the terminal apparatus 202 is configured to check, based on the received RRC configuration signalling, a channel quality indicator mode of the received RRC configuration signalling. Based on said checking, the terminal apparatus is configured to determine, in step 402, a size for a periodic channel quality indicator report regarding the terminal apparatus. Based on said determining, the terminal apparatus is configured to select, in step 402, a physical uplink control channel transmission format for the periodic channel quality indicator report. If the determined size of the periodic channel quality indicator report is small (e.g. four bits or less), a modified physical uplink control channel format 1b is selected 402 as the physical uplink control channel transmission format for the periodic channel quality indicator report. (However, if the determined size of the periodic channel quality indicator report is more than four bits, a physical uplink control channel format 2 is selected 402 as the physical uplink control channel transmission format for the periodic channel quality indicator report). Then, the terminal apparatus transmits 403 a periodic channel quality indicator report by using the selected physical uplink control channel transmission format (e.g. format 1b) by utilizing physical resource blocks reserved for physical uplink control channel transmission format 2. In step 404, the network apparatus 201 receives and applies the periodic channel quality indicator report with the selected format (e.g. modified PUCCH format 1b). eNB may also be configured to explicitly signal the new 4-bit CQI format instead of UE deriving the new 4-bit CQI format from the size of the CQI report. eNB may be arranged to configure the 4-bit CQI format with an earlier transmission format. Thus the new 4-bit format may be selected in UE based on the container determined for a periodic channel quality indicator report. In that case if the determined container of the periodic channel indicator report is a reduced-bit container, the modified physical uplink control channel format 1b is selected as the physical uplink control channel transmission format for the periodic channel indicator report to be transmitted from the user equipment 202 to the network apparatus 201. The container of the periodic channel indicator report is determined to be a reduced-bit container if the size for the periodic channel indicator report is four bits or less (the container is determined in UE based on direct or indirect information received from eNB) (If the determined container of the periodic channel quality indicator report is a non-reduced bit container, a physical uplink control channel format 2 is selected 402 as the physical uplink control channel transmission format for the periodic channel quality indicator report).

Figure 5:
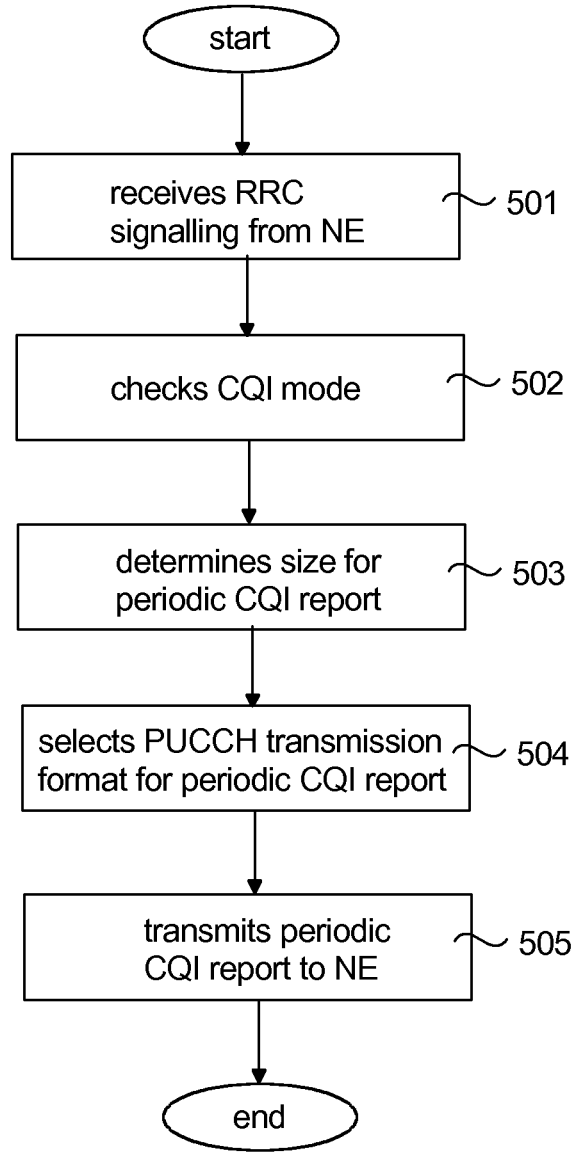
FIG. 5 shows a schematic diagram of a flow chart according to an exemplary embodiment.

FIG. 5 is a flow chart illustrating an exemplary embodiment. The terminal apparatus 202 (user equipment UE) is configured to receive, in step 501, radio resource configuration (RRC) signalling from a network apparatus 201. In order to select the PUCCH transmission format for the periodic CQI report for UE, the user equipment 202 checks 502 the CQI mode of the received radio resource configuration (RRC) signalling. Based on the checking, UE determines 503 a container of a periodic channel quality indicator report. Based on the determined container, UE selects 504 the PUCCH transmission format for the periodic CQI report. If the determined container of the periodic CQI report is a reduced-bit container (i.e. the size of the report is 4 bits or less), a modified PUCCH format 1b is selected 504 as the PUCCH transmission format for the periodic CQI report. In step 505, UE transmits the periodic CQI report to the network apparatus 201, by using the selected PUCCH transmission format (e.g. modified PUCCH format 1b) by utilizing PRBs reserved for PUCCH transmission format 2.

Figure 6:
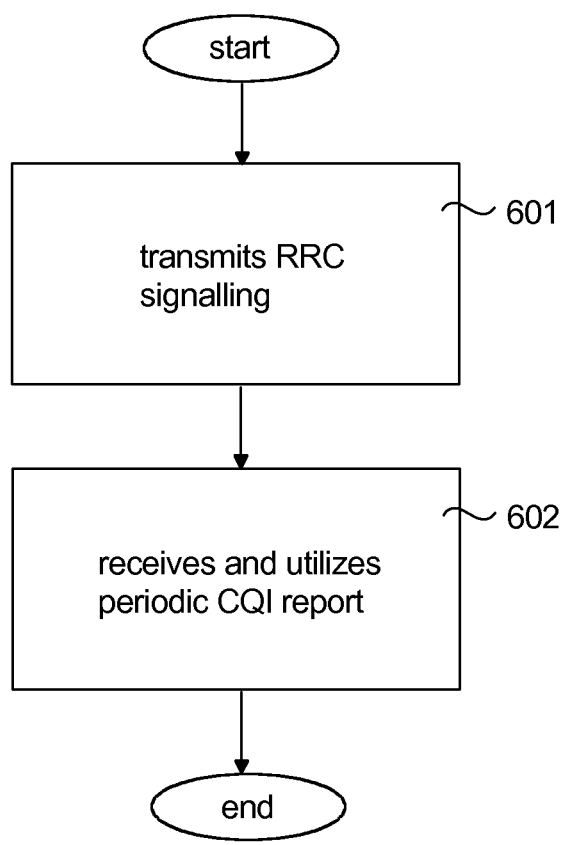
FIG. 6 shows a schematic diagram of a flow chart according to another exemplary embodiment.

FIG. 6 is a flow chart illustrating an exemplary embodiment. The network apparatus 201, which may comprise e.g. a base station (eNB), is configured to transmit, in step 601, radio resource configuration (RRC) signalling to a terminal apparatus 202. In step 602, the network apparatus receives a periodic CQI report sent by UE by using a selected PUCCH transmission format (e.g. modified PUCCH format 1b) by utilizing PRBs reserved for PUCCH transmission format 2. Based on the receiving, the network apparatus is configured to utilize 602 the periodic CQI report with the format (e.g. modified PUCCH format 1b) selected by UE for the network apparatus, for defining a signal-interference relation of the channel, uplink resource allocation, and/or for multiple-input multiple-output (MIMO) transmission.

Thus, according to an exemplary embodiment, there is provided a method comprising performing, in a network apparatus, the method steps of receiving radio resource configuration signalling from a network apparatus; checking a channel indicator mode of the received radio resource configuration signalling; based on said checking, determining a container for a periodic channel indicator report; and, based on said determining, selecting a physical uplink control channel transmission format for the periodic channel indicator report, wherein if the determined container of the periodic channel indicator report is a reduced-bit container, a modified physical uplink control channel format 1b is selected as the physical uplink control channel transmission format for the periodic channel indicator report to be transmitted from the user equipment to the network apparatus.

According to another exemplary embodiment, there is provided a terminal apparatus for a communications system, the apparatus being configured to receive radio resource configuration signalling from a network apparatus; check a channel indicator mode of the received radio resource configuration signalling; based on said checking, determine a container for a periodic channel indicator report; and, based on said determining, select a physical uplink control channel transmission format for the periodic channel indicator report, wherein if the determined container of the periodic channel indicator report is a reduced-bit container, the apparatus is configured to select a modified physical uplink control channel format 1b as the physical uplink control channel transmission format for the periodic channel indicator report to be transmitted from the terminal apparatus to the network apparatus.

According to yet another exemplary embodiment, there is provided a network apparatus for a communications system, the apparatus being configured to transmit radio resource configuration signalling to a user equipment; receive a periodic channel indicator report from the user equipment, the periodic channel indicator report being transmitted by the user equipment by using a physical uplink control channel transmission format selected by the user equipment based on the container of the periodic channel indicator report; and utilize the received periodic channel indicator report for defining a signal interference relation of the channel, uplink resource allocation, and/or for multiple-input multiple-output transmission.

According to yet another exemplary embodiment, there is provided a communications system configured to receive, in a terminal apparatus, a radio resource configuration signalling from a network apparatus; check a channel indicator mode of the received radio resource configuration signalling; based on said checking, determine a container for a periodic channel indicator report to be transmitted from the terminal apparatus to the network apparatus; and based on said determining, selecting a physical uplink control channel transmission format for the periodic channel indicator report, wherein if the determined container of the periodic channel indicator report is a reduced-bit container, a modified physical uplink control channel format 1b is selected as the physical uplink control channel transmission format for the periodic channel indicator report to be transmitted from the terminal apparatus to the network apparatus.

According to yet another exemplary embodiment, there is provided a computer-readable storage medium embodying a program of instructions executable by a processor to perform actions directed toward receiving, in a terminal apparatus, radio resource configuration signalling from a network apparatus; checking a channel indicator mode of the received radio resource configuration signalling; based on said checking, determining a container for a periodic channel indicator report to be transmitted from the terminal apparatus to the network apparatus; and, based on said determining, selecting a physical uplink control channel transmission format for the periodic channel indicator report, wherein if the determined container of the periodic channel indicator report is a reduced-bit container, a modified physical uplink control channel format 1b is selected as the physical uplink control channel transmission format for the periodic channel indicator report to be transmitted from the terminal apparatus to the network apparatus.

According to yet another exemplary embodiment, there is provided an apparatus configured to transmit the periodic channel indicator report by using the selected physical uplink control channel transmission format by utilizing physical resource blocks reserved for physical uplink control channel transmission format 2.

According to yet another exemplary embodiment, there is provided an apparatus configured to determine the container of the periodic channel indicator report to be a reduced-bit container if the determined size of the of the periodic channel indicator report is four bits or less.

According to yet another exemplary embodiment, there is provided an apparatus configured to determine that the container of a periodic channel indicator report is a reduced-bit container, if the channel indicator mode of the received radio resource configuration signalling is a wideband channel indicator mode.

According to yet another exemplary embodiment, there is provided an apparatus is configured to modify the physical uplink control channel transmission format 1b by replacing a normal block-wise spreading with a spreading factor of 4, with two blocks of block-wise spread SC-FDMA symbols, with both blocks using a spreading factor of 2, wherein in the two blocks, orthogonal cover codes of the spreading factor 2 are modulated with separate data symbols.

According to yet another exemplary embodiment, there is provided an apparatus is configured to apply transmission diversity by applying space time coding between two blocks of block-wise spread SC-FDMA symbols.

According to yet another exemplary embodiment, there is provided an apparatus is configured to select a physical uplink control channel format 2 as the physical uplink control channel transmission format for the periodic channel indicator report, if the determined container of the periodic channel indicator report is a non-reduced-bit container.

According to yet another exemplary embodiment, there is provided an apparatus configured to, the modified physical uplink control channel format 1b following the existing physical uplink control channel format 2/2a/2b channelization structure, define resources using dedicated higher layer signalling, identify resources used for transmission by a resource index which is mapped directly into a single cyclic shift resource, wherein resources utilize the cell specific base sequence and cyclic shift randomization applicable to physical uplink control channel format 2/2a/2b.

According to yet another exemplary embodiment, there is provided an apparatus configured to realize a higher layer configuration of the reduced-bit container by introducing sub-channelization inside the existing physical uplink control channel format 2/2a/2b resource index which is made with one or more additional bits in the configuration signalling, wherein information elements to be used on top of existing physical uplink control channel format 2/2a/2b configuration signalling comprise a periodic channel indicator format including physical uplink control channel format 2 or modified physical uplink control channel format 1, a spreading sequence used if modified physical uplink control channel format 1b is used, a reference signal resource applicable to modified physical uplink control channel format 1b, wherein the apparatus is configured to identify the reference signal resource by a resource index and spreading sequence and/or orthogonal cover code applied over reference signal SC-FDMA symbols, wherein the apparatus is configured to derive reference signal resource from the signalled resource index.

According to yet another exemplary embodiment, there is provided an apparatus configured to perform a block spreading operation with transmission diversity for the modified physical uplink control channel format 1b with a spreading factor of 2, wherein the apparatus is configured to carry out space time coding between the block-wise spread SC-FDMA symbols in a symbol level prior to the block spreading operation.

According to yet another exemplary embodiment, there is provided an apparatus configured to use Walsh-Hadamard codes for block-wise spreading with a spreading factor 2.

According to yet another exemplary embodiment, the periodic channel indicator report comprises channel quality indicator information, rank indicator information, and/or precoding matrix indicator information.

According to yet another exemplary embodiment, there is provided an apparatus configured to receive the periodic channel indicator report with the selected physical uplink control channel transmission format by utilizing physical resource blocks reserved for physical uplink control channel transmission format 2.

According to yet another exemplary embodiment, there is provided an apparatus configured to, if the container of the periodic channel indicator report is a reduced-bit container, receive the periodic channel indicator report with a modified physical uplink control channel format 1b.

It will be obvious to a person skilled in the art that, as the technology advances, the inventive concept may be implemented in various ways. The invention and its embodiments are not limited to the examples described above but may vary within the scope of the claims.

List of Abbreviations

3GPP third generation partnership project
eNB base station, eNodeB
ACK acknowledgement
CDM code division multiplexing
CQI channel quality indicator
DL downlink
DM demodulation
ITU international telecommunication union
ITU-R ITU radio communication sector
NACK negative ACK
OFDMA orthogonal FDMA
PUCCH physical uplink control channel
PDCCH physical downlink control channel
Rel 8 3GPP Release 8
Rel 9 3GPP Release 9
SU-MIMO single-user multiple input multiple output
UE user equipment
UL uplink
UTRA UMTS terrestrial radio access
UTRAN UMTS terrestrial radio access network
SF spreading factor
RRM radio resource management
PRB physical resource block

The invention claimed is:

1. A method for periodic channel indicator reporting in a communications system, the method comprising performing, in a user equipment, the method steps of
receiving radio resource configuration signalling from a network apparatus;
checking a channel indicator mode of the received radio resource configuration signalling;
based on said checking, determining a container for a periodic channel indicator report;
based on said determining, selecting a physical uplink control channel transmission format for the periodic channel indicator report, wherein if the determined container of the periodic channel indicator report is a reduced-bit container, a modified physical uplink control channel format 1b is selected as the physical uplink control channel transmission format for the periodic channel indicator report to be transmitted from the user equipment to the network apparatus.

2. A method according to claim 1, wherein the method comprises transmitting the periodic channel indicator report by using the selected physical uplink control channel transmission format by utilizing physical resource blocks reserved for physical uplink control channel transmission format 2.

3. A method according to claim 1, wherein the container of the periodic channel indicator report is determined to be a reduced-bit container if a determined size for the periodic channel indicator report is four bits or less.

4. A method according to claim 1 wherein if the channel indicator mode of the received radio resource configuration signalling is a wideband channel indicator mode, the method comprises determining that the container of a periodic channel indicator report is a reduced-bit container.

5. A method according to claim 1, wherein the physical uplink control channel transmission format 1b is modified by replacing a normal block-wise spreading with a spreading factor of 4, with two blocks of block-wise spread SC-FDMA symbols, with both blocks using a spreading factor of 2, wherein in the two blocks, orthogonal cover codes of the spreading factor 2 are modulated with separate data symbols.

6. A method according to claim 1, wherein a transmission diversity method is applied such that space time coding is applied between two blocks of block-wise spread SC-FDMA symbols in modified physical uplink control channel format 1b.

7. A method according to claim 1, wherein if the container of the periodic channel indicator report is a non-reduced-bit container, a physical uplink control channel format 2 is selected as the physical uplink control channel transmission format for the periodic channel indicator report.

8. A method according to claim 1, wherein the modified physical uplink control channel format 1b follows the existing physical uplink control channel format 2/2a/2b channelization structure,
resources are defined using dedicated higher layer signalling,
resources used for transmission are identified by a resource index which is mapped into a single cyclic shift resource,
resources utilize the cell specific base sequence and cyclic shift randomization applicable to physical uplink control channel format 2/2a/2b.

9. A method according to claim 1, wherein a higher layer configuration of the reduced-bit container is realized by introducing sub-channelization inside the existing physical uplink control channel format 2/2a/2b resource index which is made with one or more additional bits in the configuration signalling, wherein information elements to be used on top of existing physical uplink control channel format 2/2a/2b configuration signalling comprise
a periodic channel indicator format including physical uplink control channel format 2 or modified physical uplink control channel format 1, a spreading sequence used if modified physical uplink control channel format 1 b is used, a reference signal resource applicable to modified physical uplink control channel format 1 b, wherein the reference signal resource is identified by a resource index and spreading sequence and/or orthogonal cover code applied over reference signal SC-FDMA symbols, wherein reference signal resource is derived from the signalled resource index.

10. A method according to claim 1, wherein the method comprises a block spreading operation with transmission diversity for the modified physical uplink control channel format 1b with a spreading factor of 2, wherein space time coding between the block-wise spread SC-FDMA symbols is carried out in a symbol level prior to the block spreading operation.

11. A method according to claim 1, wherein Walsh-Hadamard codes are used for block-wise spreading with a spreading factor 2.

12. A terminal apparatus for a communications system, the apparatus being configured to receive radio resource configuration signalling from a network apparatus;

check a channel indicator mode of the received radio resource configuration signalling;

based on said checking, determine a container for a periodic channel indicator report;

based on said determining, select a physical uplink control channel transmission format for the periodic channel indicator report, wherein if the determined container of the periodic channel indicator report is a reduced-bit container, the apparatus is configured to select a modified physical uplink control channel format 1b as the physical uplink control channel transmission format for the periodic channel indicator report to be transmitted from the terminal apparatus to the network apparatus.

13. An apparatus according to claim 12, wherein the apparatus is configured to transmit the periodic channel indicator report by using the selected physical uplink control channel transmission format by utilizing physical resource blocks reserved for physical uplink control channel transmission format 2.

14. An apparatus according to claim 12, wherein the apparatus is configured to determine the container of the periodic channel indicator report to be a reduced-bit container if a determined size of the periodic channel indicator report is four bits or less.

15. An apparatus according to claim 12, wherein if the channel indicator mode of the received radio resource configuration signalling is a wideband channel indicator mode, the apparatus is configured to determine that the container of a periodic channel indicator report is a reduced-bit container.

16. An apparatus according to claim 12, wherein the apparatus is configured to modify the physical uplink control channel transmission format 1b by replacing a normal block-wise spreading with a spreading factor of 4, with two blocks of block-wise spread SC-FDMA symbols, with both blocks using a spreading factor of 2, wherein in the two blocks, orthogonal cover codes of the spreading factor 2 are modulated with separate data symbols.

17. An apparatus according to claim 12, wherein the apparatus is configured to apply transmission diversity by applying space time coding between two blocks of block-wise spread SC-FDMA symbols in modified physical uplink control channel format 1 b.

18. An apparatus according to claim 12, wherein if the determined container of the periodic channel indicator report is a non-reduced-bit container, the apparatus is configured to select a physical uplink control channel format 2 as the physical uplink control channel transmission format for the periodic channel indicator report.

19. An apparatus according to claim 12, wherein the modified physical uplink control channel format 1b follows the existing physical uplink control channel format 2/2a/2b channelization structure, wherein the apparatus is configured to define resources using dedicated higher layer signalling, identify resources used for transmission by a resource index which is mapped directly into a single cyclic shift resource, wherein resources utilize the cell specific base sequence and cyclic shift randomization applicable to physical uplink control channel format 2/2a/2b.

20. An apparatus according to any of claims 12 to 19 claim 12, wherein the apparatus is configured to realize a higher layer configuration of the reduced-bit container by introducing sub-channelization inside the existing physical uplink control channel format 2/2a/2b resource index which is made with one or more additional bits in the configuration signalling, wherein information elements to be used on top of existing physical uplink control channel format 2/2a/2b configuration signalling comprise a periodic channel indicator format including physical uplink control channel format 2 or modified physical uplink control channel format 1, a spreading sequence used if modified physical uplink control channel format 1 b is used, a reference signal resource applicable to modified physical uplink control channel format 1 b, wherein the apparatus is configured to identify the reference signal resource by a resource index and spreading sequence and/or orthogonal cover code applied over reference signal SC-FDMA symbols, wherein the apparatus is configured to derive reference signal resource from the signalled resource index.

21. An apparatus according to claim 12, wherein the apparatus is configured to perform a block spreading operation with transmission diversity for the modified physical uplink control channel format 1b with a spreading factor of 2, wherein the apparatus is configured to carry out space time coding between the block-wise spread SC-FDMA symbols in a symbol level prior to the block spreading operation.

22. An apparatus according to claim 12, wherein the apparatus is configured to use Walsh-Hadamard codes for block-wise spreading with a spreading factor 2.

23. An apparatus according to claim 12, wherein the periodic channel indicator report comprises channel quality indicator information, rank indicator information, and/or precoding matrix indicator information.

24. A network apparatus for a communications system, the apparatus being configured to transmit radio resource configuration signalling to a user equipment; receive a periodic channel indicator report from the user equipment, the periodic channel indicator report being transmitted by the user equipment by using a physical uplink control channel transmission format selected by the user equipment based on the container of the periodic channel indicator report; and utilize the received periodic channel indicator report for defining a signal interference relation of the channel, uplink resource allocation, and/or for multiple-input multiple-output transmission and, wherein if the container of the periodic channel indicator report is a reduced-bit container, the apparatus is configured to receive the periodic channel indicator report with a modified physical uplink control channel format 1b.

25. An apparatus according to claim 24, wherein the apparatus is configured to receive the periodic channel indicator report with the selected physical uplink control channel transmission format by utilizing physical resource blocks reserved for physical uplink control channel transmission format 2.

26. An apparatus according to claim 24, wherein the container of the periodic channel indicator report is a reduced-bit container if the determined size of the periodic channel indicator report is four bits or less.

27. A communications system configured to receive, in a terminal apparatus, radio resource configuration signalling from a network apparatus;
 check a channel indicator mode of the received radio resource configuration signalling;
 based on said checking, determine a container for a periodic channel indicator report to be transmitted from the terminal apparatus to the network apparatus;
 based on said determining, selecting a physical uplink control channel transmission format for the periodic channel indicator report, wherein if the determined container of the periodic channel indicator report is a reduced-bit container, a modified physical uplink control channel format 1b is selected as the physical uplink control channel transmission format for the periodic channel indicator report to be transmitted from the terminal apparatus to the network apparatus.

28. A non-transitory computer-readable storage medium embodying a program of instructions executable by a processor to perform actions directed toward
 receiving, in a terminal apparatus radio resource configuration signalling from a network apparatus;
 checking a channel indicator mode of the received radio resource configuration signalling;
 based on said checking, determining a container for a periodic channel indicator report to be transmitted from the terminal apparatus to the network apparatus;
 based on said determining, selecting a physical uplink control channel transmission format for the periodic channel indicator report, wherein if the determined container of the periodic channel indicator report is a reduced-bit container, a modified physical uplink control channel format 1b is selected as the physical uplink control channel transmission format for the periodic channel indicator report to be transmitted from the terminal apparatus to the network apparatus.

* * * * *

UNITED STATES PATENT AND TRADEMARK OFFICE
CERTIFICATE OF CORRECTION

| | | |
|---|---|---|
| PATENT NO. | : 9,042,328 B2 | Page 1 of 1 |
| APPLICATION NO. | : 13/983586 | |
| DATED | : May 26, 2015 | |
| INVENTOR(S) | : Kari Pekka Pajukoski et al. | |

It is certified that error appears in the above-identified patent and that said Letters Patent is hereby corrected as shown below:

In Claim 20:
Column 16, line 18, "any of claims 12 to 19" should be deleted.

Signed and Sealed this
First Day of December, 2015

Michelle K. Lee
*Director of the United States Patent and Trademark Office*